United States Patent [19]

Yu et al.

[11] Patent Number: 5,321,499
[45] Date of Patent: Jun. 14, 1994

[54] DICHROIC MIRROR AND AN IMAGE PROJECTION APPARATUS USING THE SAME

[75] Inventors: Jang-hun Yu, Kyungki-do; Jung-an Kim, Seoul, both of Rep. of Korea

[73] Assignee: Samsung Electronics Co., Ltd., Kyungki-Do, Rep. of Korea

[21] Appl. No.: 23,969

[22] Filed: Feb. 26, 1993

[30] Foreign Application Priority Data

Feb. 29, 1992 [KR] Rep. of Korea .................. 92-3322

[51] Int. Cl.$^5$ ............................................. H04N 9/31
[52] U.S. Cl. ..................................... 348/757; 359/634; 348/780
[58] Field of Search ................... 358/60, 231, 237; 359/634, 636, 637; H04N 5/74, 9/31

[56] References Cited

U.S. PATENT DOCUMENTS 4,687,301 8/1987 Ledebuhr .......................... 359/634
5,198,930 3/1993 Muratomi ...................... 359/634 X

FOREIGN PATENT DOCUMENTS 364039 4/1990 European Pat. Off. ........ H04N 9/31
56-43866 4/1981 Japan ..................................... 358/60
57-170685 10/1982 Japan ..................................... 358/60

Primary Examiner—Mark R. Powell
Attorney, Agent, or Firm—Sughrue, Mion, Zinn, Macpeak & Seas

[57] ABSTRACT

An image projection apparatus such as a video projector or projection television is provided for decreasing light loss. The apparatus has three cathode ray tubes for respectively providing images of red, green and blue, two dichroic mirrors for combining the images onto the same axis, and a lens group for enlarging and projecting the combined image toward a screen, wherein the inclination of each dichroic mirror is adjusted such that the incident angle of light incoming from the cathode ray tube to the dichroic mirror is less than 45°. Thus, the degree of stop-band shift due to refractive index variations of an incidence medium is decreased. Also, the reflectance for incoming light having a wavelength coincident with the stop band is increased.

6 Claims, 7 Drawing Sheets

DICHROIC MIRROR AND AN IMAGE PROJECTION APPARATUS USING THE SAME

BACKGROUND OF THE INVENTION

The present invention relates to an image projection apparatus for projecting television images, and more particularly to an image projection apparatus for projecting color images by combining images generated from a plurality of cathode ray tubes.

In the technical field of image display, direct-viewing type cathode ray tubes (CRTs) for televisions have proven incapable of providing a relatively large image display, currently being limited to forty-inch screens. Thus, larger screen sizes generally bring about problems with respect to practicality, due to increased difficulty in manufacturing and diminishing resolution. On the other hand, since the image projection apparatus projects an image from image generating surfaces of small projection cathode ray tubes to a screen by means of an optical apparatus such as a lens, a large-sized image of better picture quality can be realized by improving performance of the optical apparatus.

The image projection apparatus generally comprises three projection-type CRTs each having an image generating surface with phosphors for illuminating red, green and blue, and projection lenses for enlarging and projecting images. Additionally, in order to combine the images of the three CRTs, a certain image projection apparatus comprises two dichroic mirrors which reflect one image of red, green and blue but allow other images to be passed (see U.S. Pat. Nos. 4,607,280 and 4,842,394).

Such an image projecting apparatus having two dichroic mirrors is constructed as shown in FIG. 1. Three CRTs 1, 2 and 3 are arranged in a T-configuration, and two dichroic mirrors 5 and 6 are arranged in an X-configuration such that respective dichroic mirrors are inclined by 45° with respect to optical axes of the cathode ray tubes to intersect with each other at the point where the respective optical axes of the cathode ray tubes meet, and a projection lens group 7 is provided in front of the dichroic mirrors. In the image projection apparatus constructed as above, in order to enhance the performance of the optical system, an increase in the reflectance of the dichroic mirror is necessary along with the elimination of lens element aberration.

In U.S. Pat. No. 4,607,280, two dichroic mirrors are installed in a space filled with air. In such an arrangement, since coma aberration occurs due to the refractive index of the two dichroic mirrors, many lens elements are required for compensating the coma aberration.

In case of U.S. Pat. No. 4,842,394, the dichroic mirrors are installed in an oil-filled space having a predetermined refractive index, thereby contriving the improvement of axial performance. However, in such a structure, the refractive index of the oil is varied due to the heat generated in the cathode ray tubes, and the degree of shift in the so-called "stop band" according to the variance of incident angle of light emitted from the cathode ray tube toward the dichroic mirror is increased, resulting in a severe variation in color and a significant degradation of the reflectance.

SUMMARY OF THE INVENTION

Therefore, it is the object of the present invention to provide an image projection apparatus in which the loss of light is reduced by increasing the reflectance of two dichroic mirrors.

To accomplish the object of the present invention, there is provided an image projection apparatus comprising three cathode ray tubes for respectively generating images of red, green and blue, two dichroic mirrors for reflecting any one among the red, green and blue images and allowing the remaining images to be passed to thus combine the red, green and blue images, and lens means for enlarging and projecting the combined image to a large-sized screen, wherein two of the three cathode ray tubes are arranged to be symmetrical to each other with respect to the optical axis of the other cathode ray tube, so as to form an angle between the optical axes of the two cathode ray tubes which is less than 180°, and the two dichroic mirrors are arranged to allow the incident angle of light incoming from the two cathode ray tubes to be less than 45°, respectively.

According to the present invention, since the incident angle of light from the cathode ray tube with respect to the dichroic mirror is smaller than 45°, the degree of the stop-band shift of the dichroic mirrors, which is caused by variations in the refractive index of an incidence medium, e.g., cooling oil, is decreased. As compared with the reflectance in the stop band of a dichroic mirror typically designed with an incident angle of 45°, an increase of the reflectance, when light having a wavelength coincident with the stop band of light toward the dichroic mirror whose inclination is adjusted is incident, will be achieved according to the embodiments described below.

BRIEF DESCRIPTION OF THE DRAWINGS

The above objects and other advantages of the present invention will become more apparent in view of a detailed description of a preferred embodiment of the present invention with reference to the attached drawings in which.

DETAILED DESCRIPTION OF THE INVENTION

Hereinafter, one preferred embodiment of the present invention will be described with reference to the accompanying drawings.

Figure 1:
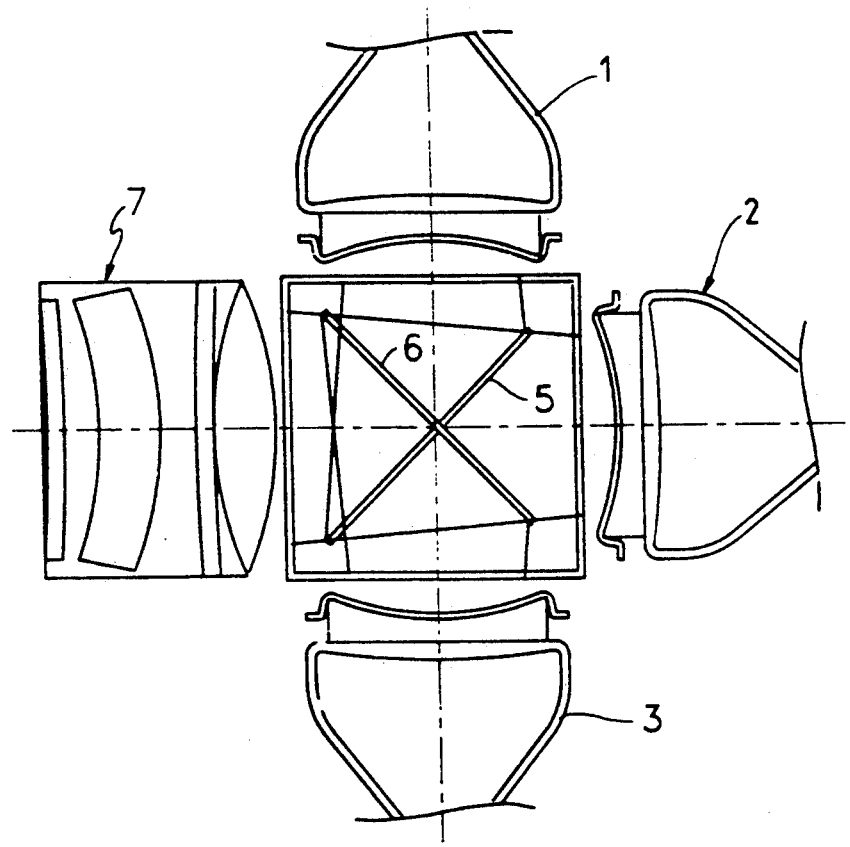
FIG. 1 is a sectional view showing a conventional image projection apparatus.
Figure 2:
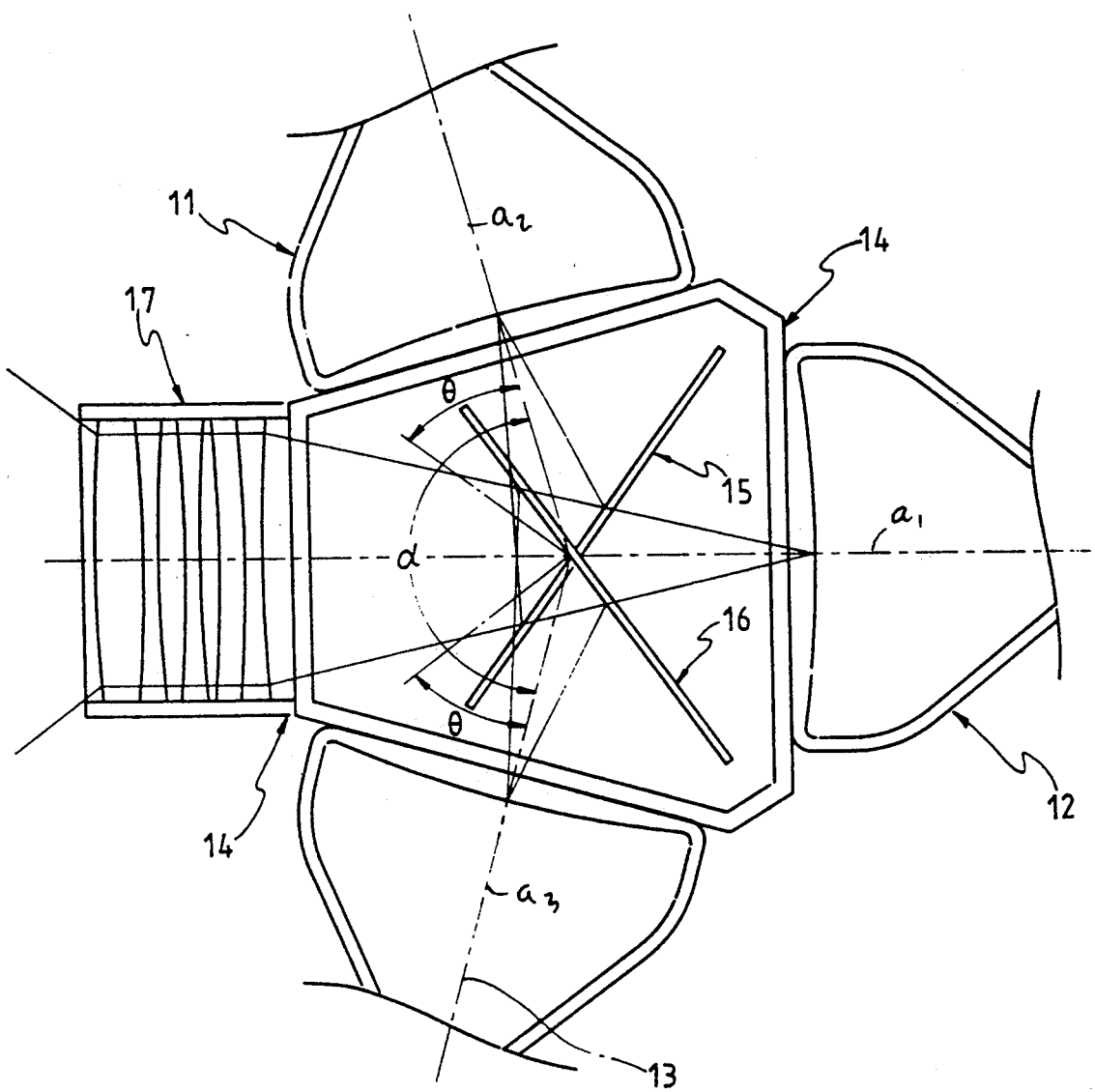
FIG. 2 is a sectional view showing an image projection apparatus according to the present invention.

In the embodiment of the present invention shown in FIG. 2, three cathode ray tubes 11, 12 and 13 for respectively generating red, green and blue are arranged in a Y-configuration, and a trapezoidal oil box 14 for cooling the face glass of the cathode ray tube is installed amid the three cathode ray tubes. Oil box 14 is filled with cooling oil having a predetermined refractive index. In the present invention, two dichroic mirrors 15 and 16 for combining the red, green, and blue images generated from the cathode ray tubes are provided within oil box 14, and a projection lens unit 17 for enlarging a color image combined by dichroic mirrors 15 and 16 to project the enlarged color image to a forward screen (not shown) is installed in front of the dichroic mirrors.

Among cathode ray tubes 11, 12 and 13, the optical axis $a_1$ of green-image cathode ray tube 12 directly advances toward the center of the projection screen. Also, the optical axes $a_2$ and $a_3$ of the red-image and blue-image cathode ray tubes 11 and 13 each pass through one point of optical axis $a_1$ and toward the projection screen, such that the mutually created angle $\alpha$ between axes $a_2$ and $a_3$ is less than 180°.

The assemblage of dichroic mirrors 15 and 16 reflects the red image and the blue image from cathode ray tubes 11 and 13, respectively, and transmits the remaining images without change, wherein the inclination of each dichroic mirror is adjusted such that their images line up with the optical axis of lens unit 17. Accordingly, each incident angle $\theta$ of the optical axes $a_2$ and $a_3$ with respect to a line normal to dichroic mirrors 15 and 16, respectively, becomes smaller than 45°.

Suitable values of mutual angle $\alpha$ and incident angle $\theta$ will be described below.

In an analysis of optical thin films, the reflectance and transmittance of a dichroic mirror are expressed by the admittance of a boundary plane and the characteristic matrix of the thin film. By presenting the optical admittance of a medium in units of admittance under vacuum, an optical constant (refractive indices and absorption coefficient) can be obtained.

When incident light is slanting with respect to thin film, the optical constants with respect to P and S polarizations are written: $N_p=(\eta-ik)\sec\theta$; and $N_s=(\eta-ik)\cos\theta$. Also, the characteristic matrix is expressed:

$$[M_p] = \begin{bmatrix} \cos\delta & i\sin\delta/Np \\ iNp\sin\delta & \cos\delta \end{bmatrix}$$

$$[M_s] = \begin{bmatrix} \cos\delta & i\sin\delta/Np \\ iNp\sin\delta & \cos\delta \end{bmatrix}$$

given that $\delta = 2\pi N_p$ and $_sd/\lambda$ where, N designates an optical constant with respect to P polarization, $N_s$ is an optical constant with respect to S polarization, $\eta$ is a refractive index of a thin film, i is an imaginary unit, k is an absorption value of the thin film, $\theta$ is the angle of incidence of light with respect to the thin film, d is the thickness of the thin film, and $\lambda$ is the wavelength of the incident light.

That is, when the incident angle $\theta$ is such that $\cos\theta$ is not equal to one, the characteristic matrices of the P and S polarization components of the light incident to the thin film differ from each other. Accordingly, as the angle of light $\theta$ approaches zero, the difference in transmission characteristics between the P and S polarization components can be decreased. The variance of the incident angle when light is incident to the film via an incidence medium is defined:

$$\cos\theta = \sqrt{1 - \left(\frac{\eta_o}{\eta}\right)^2 \sin^2\theta_o}$$

where $\eta_0$ denotes the refractive index of the incidence medium, and $\theta_0$ is the incident angle of light incoming from the incidence medium to the thin film. Here, when the incidence medium is something other than air, the value of $\cos\theta$ is far from one. Therefore, in order to easily adjust the thin film characteristic in correspondence to the variance of the incident angle, the most preferable method is to keep the incident angle as small as possible.

In designing the dichroic mirrors, if the refractive indices of the substrate and medium are similar, in order to decrease the shift of the stop band according to the variations of the incident angle, the red-image and blue-image cathode ray tubes are slanted toward the screen to thereby make their optical axes form an angle of 150°. In this state, the incident angle is 37.5°. These conditions serve as an important factor for decreasing light loss and improving optical performance in the projection system. Thus, in preferred embodiments of the present invention, dichroic mirrors 15 and 16 shown in FIGS. 3 and 4 have maximum reflectance in the reference incident angle of 37.5.

Figure 3:
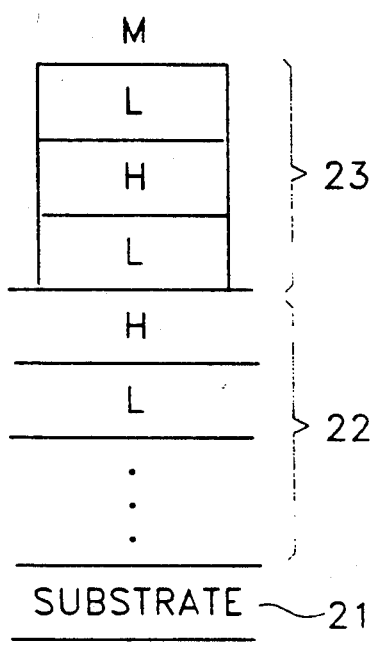
FIG. 3 is a representation of the layers constituting the dichroic mirror for red used in the image projection apparatus according to the present invention.

To begin with, red-image dichroic mirror 15 shown in FIG. 3 has 31 layers in all, wherein a plurality of low-refractive (L) and high-refractive (H) layers 22 are alternately stacked on a substrate 21 to form a basic stacking, and an L-H-L-stacked matching layer 23 is provided between layers 22 and an incidence medium M such as oil having a predetermined refractive index. The thickness and refractive index of each layer constituting red-image dichroic mirror 15 is shown in Table 1.

TABLE 1

| constituting layer | thickness (mm) | refractive index |
|---|---|---|
| medium (oil) | — | 1.5 |
| "L" layer of layer 23 | 0.178 | 1.46 |
| "H" layer of layer 23 | 0.242 | 2.45 |
| "L" layer of layer 23 | 0.455 | 1.46 |
| "H" layer of layers 22 | 0.280 | 2.45 |
| "L" layer of layers 22 | 0.049 | 1.46 |
| — | — | — |
| — | — | — |
| — | — | — |
| substrate | — | 1.52 |

Figure 5A:
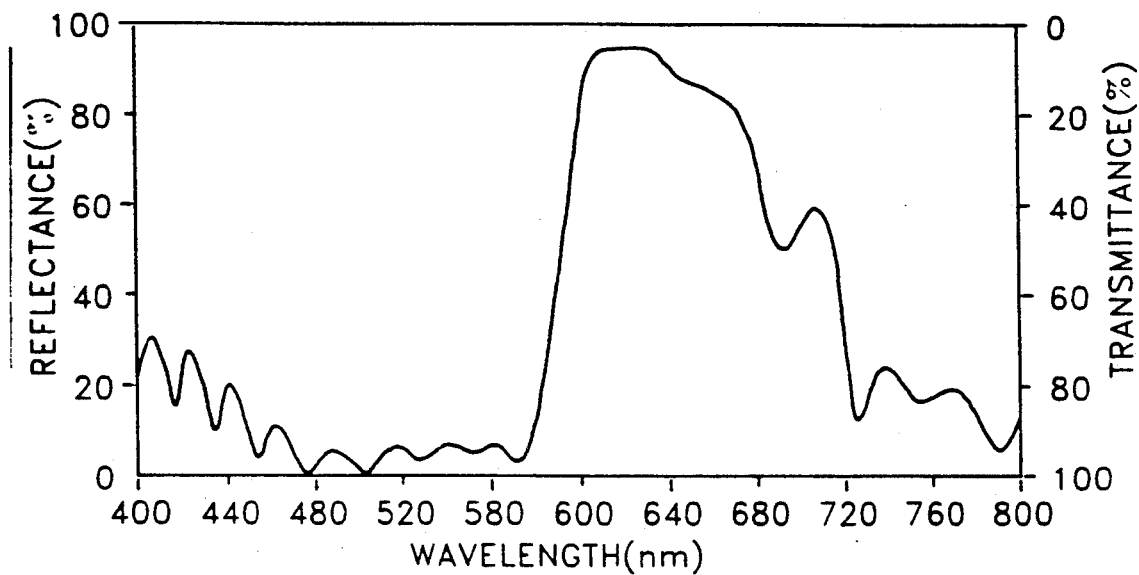
FIG. 5A shows a graph representing the reflectance and transmittance at a 37.5° reference incident angle of the dichroic mirror for red shown in FIG. 3.
Figure 5B:
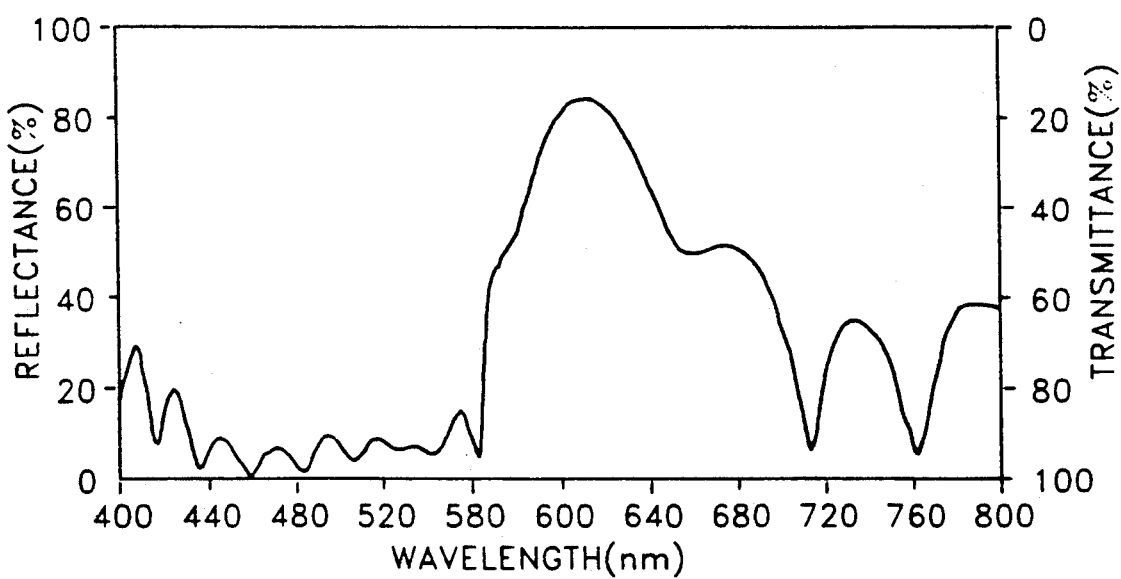
FIG. 5B shows a graph representing the reflectance and transmittance at a 45° reference incident angle of the dichroic mirror for red shown in FIG. 3.
Figure 6A:
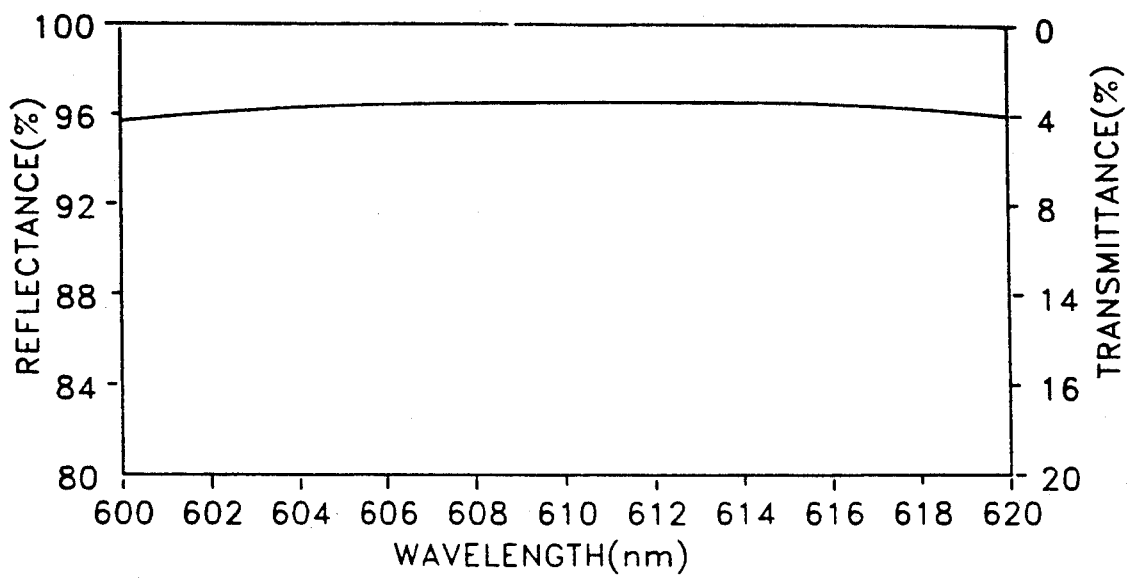
FIG. 6A is a graph representing the reflectance and transmittance of the wavelength area having the peak as plotted in the graph of FIG. 5A.
Figure 6B:
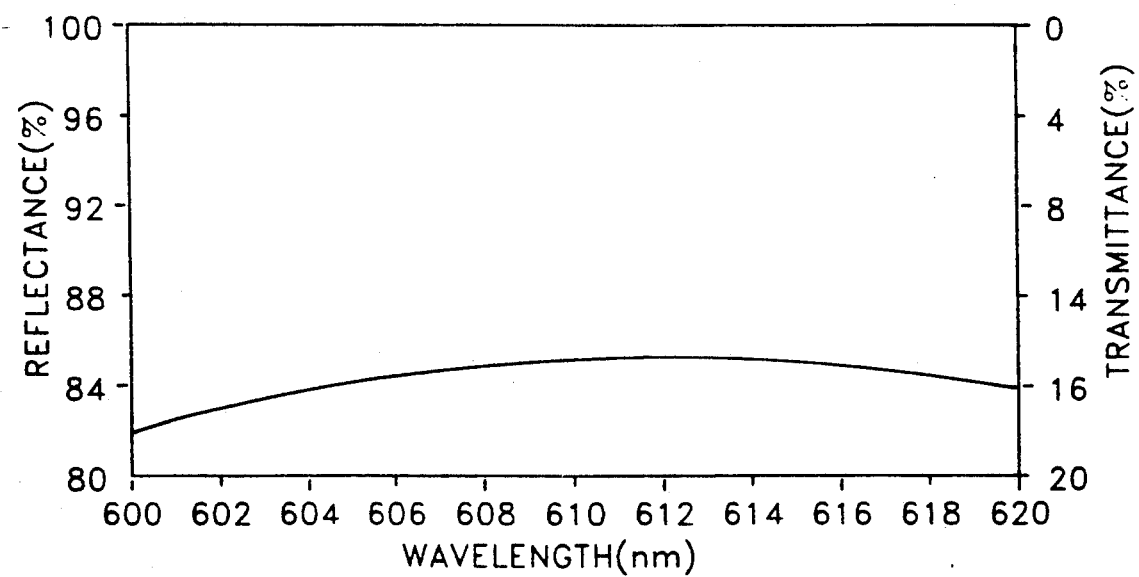
FIG. 6B is a graph representing the reflectance and transmittance of the wavelength area having the peak as plotted in the graph of FIG. 5B.

The spectral characteristic of red-image dichroic mirror 15 with respect to a reference wavelength of 1020 nm and a reference incident angle of 37.5° is shown in FIG. 5A. Additionally, FIG. 5B shows the spectral characteristic at a 45° reference incident angle as a comparative example. Likewise, in FIGS. 6A and 6B, spectral characteristics with respect to a reference wavelength of 1073 nm and the same incident angles are illustrated as comparative examples.

Figure 4:
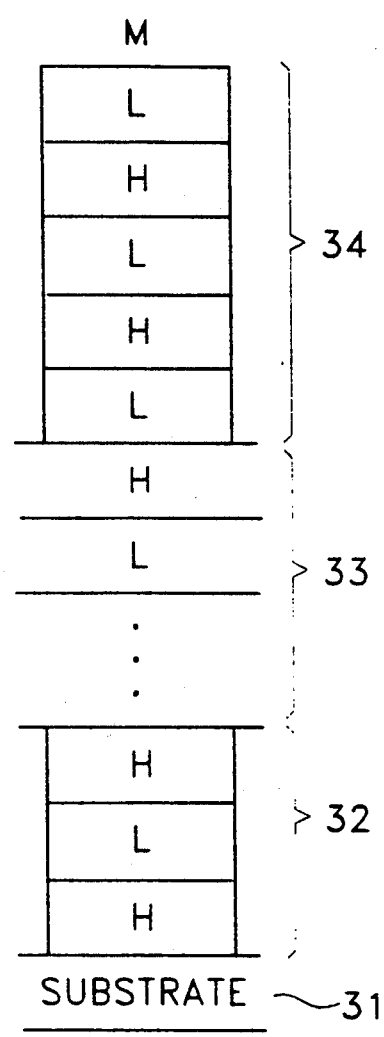
FIG. 4 is a representation of the layers constituting the dichroic mirror for blue used in the image projection apparatus according to the present invention.

Further, the blue-image dichroic mirror 16 in FIG. 4 is composed of 32 layers in all, which has an H-L-H-stacked lower matching layer 32 between a substrate 31 and a basic stacking of a plurality of low and high refractive layers 33, and an L-H-L-H-L-stacked upper matching layer 34 between layers 33 and incidence medium M. The thickness and refractive index of each layer constituting blue-image dichroic mirror 16 is shown in Table 2.

TABLE 2

| constituting layer | thickness (mm) | refractive index |
|---|---|---|
| medium (oil) | — | 1.5 |
| "L" layer of layer 34 | 0.491 | 1.46 |
| "H" layer of layer 34 | 0.058 | 2.45 |
| "L" layer of layer 34 | 0.100 | 1.46 |
| "H" layer of layer 34 | 0.112 | 2.45 |
| "L" layer of layer 34 | 0.087 | 1.46 |
| "H" layer of layers 33 | 0.393 | 2.45 |
| "L" layer of layers 33 | 0.095 | 1.46 |
| — | — | — |
| — | — | — |
| — | — | — |
| "H" layer of layer 32 | 0.115 | 2.45 |
| "L" layer of layer 32 | 0.088 | 1.46 |
| "H" layer of layer 32 | 0.068 | 2.45 |
| substrate | — | 1.52 |

Figure 7A:
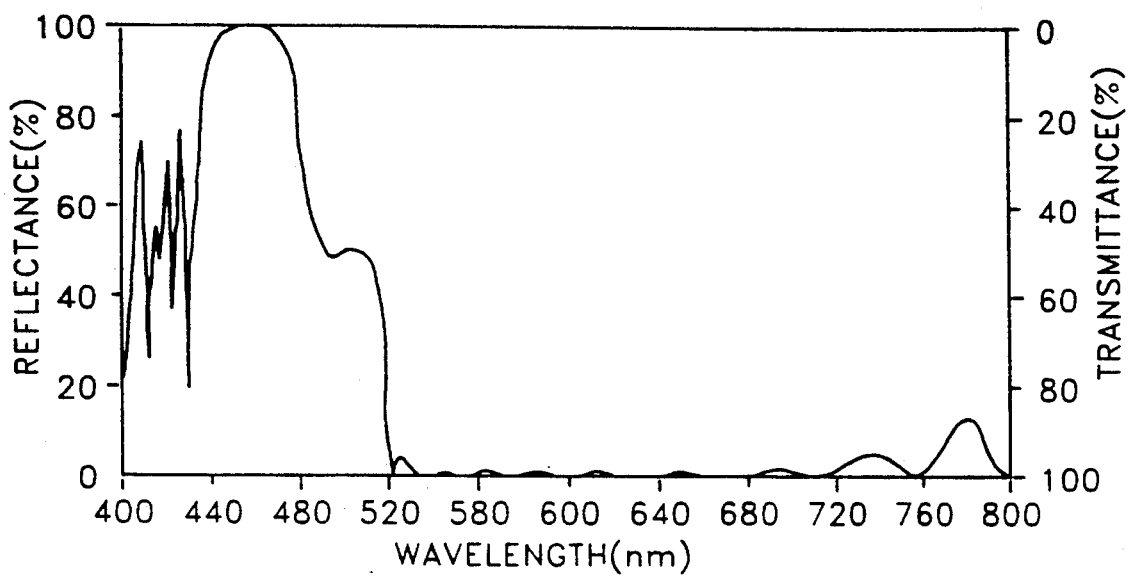
FIG. 7A is a graph representing the reflectance and transmittance at a 37.5° reference incident angle of the dichroic mirror for blue shown in FIG. 4.
Figure 7B:
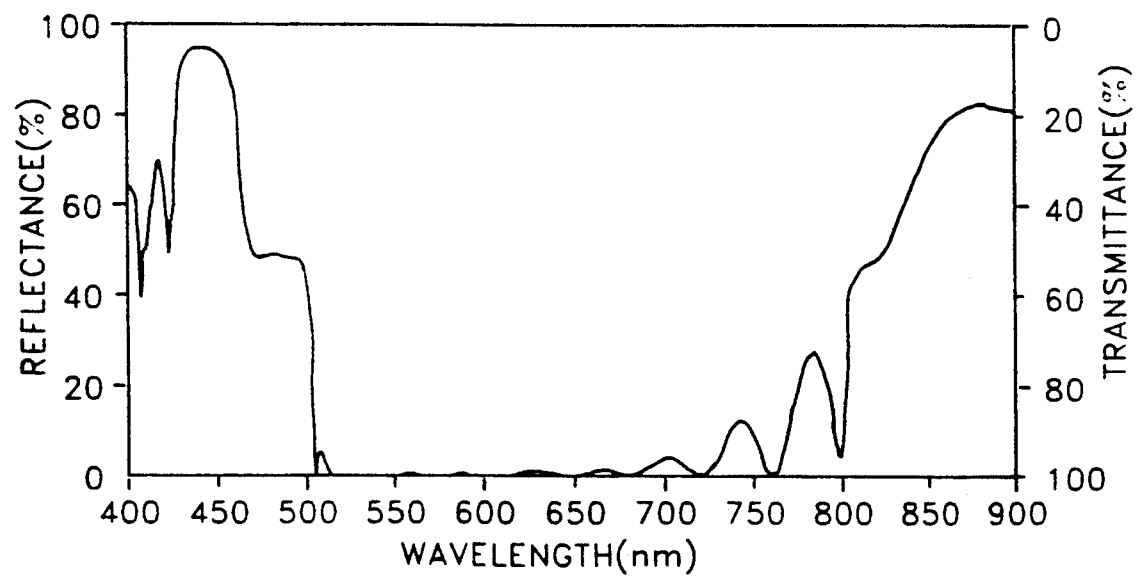
FIG. 7B shows a graph representing the reflectance and transmittance at a 45° reference incident angle of the dichroic mirror for blue shown in FIG. 4.
Figure 8A:
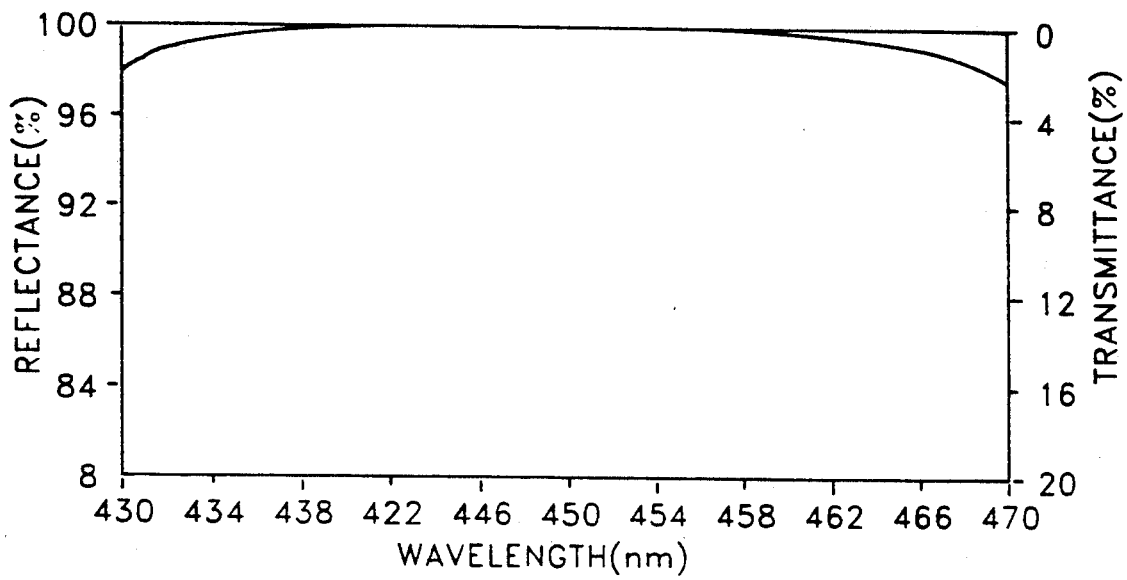
FIG. 8A is a graph representing the reflectance and transmittance of the wavelength area having the peak as plotted in the graph of FIG. 7A.
Figure 8B:
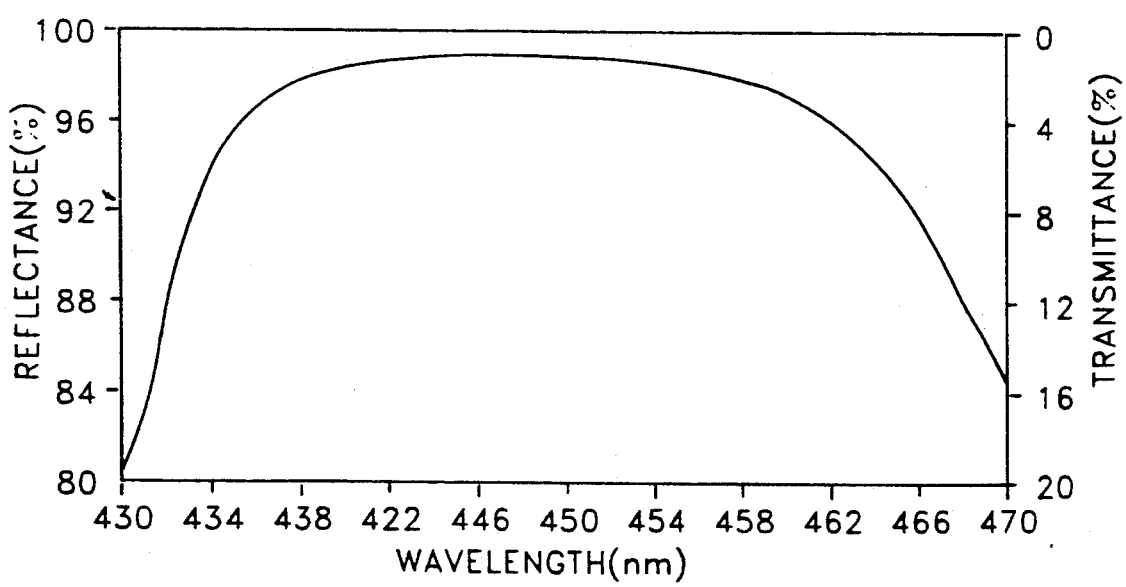
FIG. 8B is a graph representing the reflectance and transmittance of the wavelength area having the peak in the graph of FIG. 7B.

The spectral characteristic of blue-image dichroic mirror 16 with respect to a reference wavelength of 1020 nm and a reference incident angle of 37.5° is shown in FIG. 7A. Additionally, as a comparison, FIG. 7B shows the spectral characteristic for a 45° reference incident angle. Likewise, in FIGS. 8A and 8B, spectral characteristics with respect to a reference wavelength of 1073 nm and the same incident angles are illustrated.

According to the present invention as described above, in an image projection apparatus using dichroic mirrors for combining red, green and blue images, the reference incident angle of incoming light from the cathode ray tube to each dichroic mirror is kept smaller than 45°, thereby increasing the reflectance of the dichroic mirrors. At the same time, the degree of stop-band shift according to variations in the incident angle is decreased. Therefore, the present invention has the effect of decreasing light loss to 10-15%, which has conventionally been 15-20%.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In an image projection apparatus of the type having three cathode ray tubes for respectively generating images of red, green and blue, two dichroic mirrors, each for reflecting any one among the red, green and blue images and allowing the remaining images to be passed therethrough to thus combine said red, green and blue images, and lens means for enlarging and projecting the combined image to a large-sized screen, the improvement comprising:

two of said three cathode ray tubes being arranged to be symmetrical to each other with respect to the optical axis of the third said cathode ray tube, so as to form an angle of less than 180° between the optical axes of said two cathode ray tubes; and said two dichroic mirrors being arranged with respect to one another and said cathode ray tubes to allow the incident angle of light incoming from said two cathode ray tubes to be less than 45°, respectively, relative to lines normal to said two mirrors, respectively, to thereby increase the reflectance of said mirrors.

2. An image projection apparatus as set forth in claim 1, wherein both incident angles of the incoming light from said two cathode ray tubes to said two dichroic mirrors is 37.5°.

3. An image projection apparatus as set forth in claim 1, wherein one of said two dichroic mirrors is a red-image dichroic mirror having thirty-one layers comprising a substrate, a basic stacking obtained by alternately stacking a plurality of low-refractive and high-refractive layers on said substrate, and a matching layer consisting of low/high/low refractive layers formed between said basic stacking and an incidence medium.

4. An image projection apparatus as set forth in claim 1, wherein one of said two dichroic mirrors is a blue-image dichroic mirror having thirty-two layers comprising a substrate, a basic stacking obtained by alternately stacking a plurality of low-refractive and high-refractive layers on said substrate, a lower matching layer consisting of high/low/high refractive layers formed between said substrate and basic stacking, and an upper matching layer consisting of low/high/low/high/low refractive layers formed between said basic stacking and an incidence medium.

5. An image projection apparatus as set forth in claim 2, wherein one of said two dichroic mirrors is a red-image dichroic mirror having thirty-one layers comprising a substrate, a basic stacking obtained by alternately stacking a plurality of low-refractive and high-refractive layers on said substrate, and a matching layer consisting of low/high/low refractive layers formed between said basic stacking and an incidence medium.

6. An image projection apparatus as set forth in claim 5, wherein one of said two dichroic mirrors is a blue-image dichroic mirror having thirty-two layers comprising a substrate, a basic stacking obtained by alternately stacking a plurality of low-refractive and high-refractive layers on said substrate, a lower matching layer consisting of high/low/high refractive layers formed between said substrate and basic stacking, and an upper matching layer consisting of low/high/low/high/low refractive layers formed between said basic stacking and an incidence medium.

* * * * *